March 8, 1955 J. MELZER 2,703,770
MANUFACTURE OF FLAT INFLATABLE OBJECTS
Filed April 15, 1952. 4 Sheets-Sheet 1

Inventor
Jean Melzer

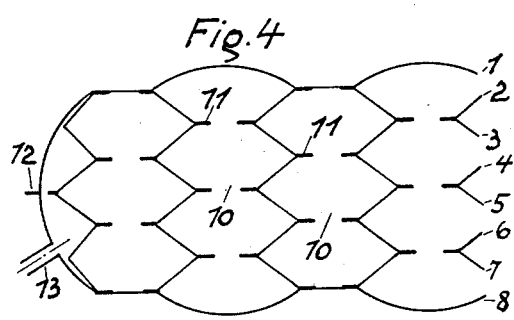
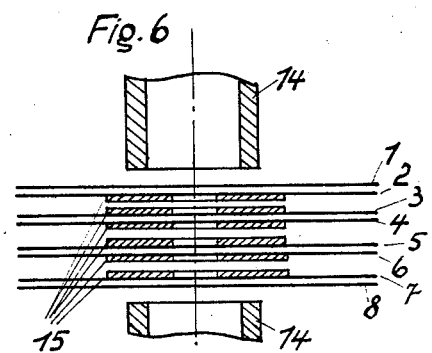
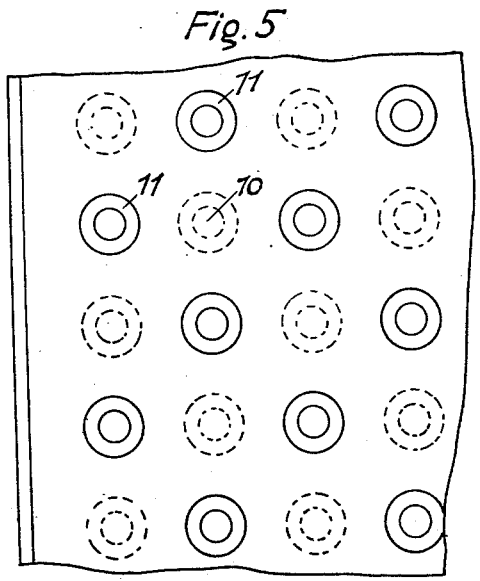
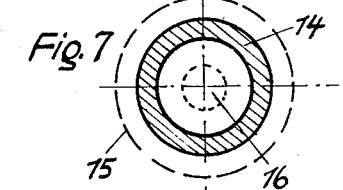
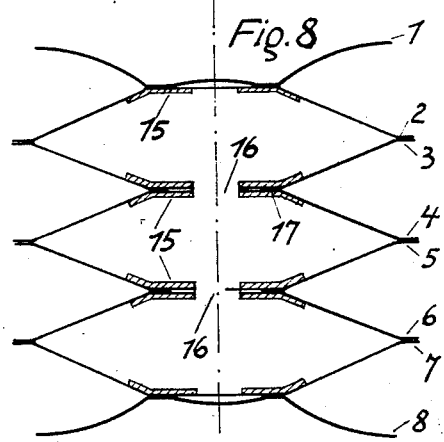

March 8, 1955 J. MELZER 2,703,770
MANUFACTURE OF FLAT INFLATABLE OBJECTS
Filed April 15, 1952 4 Sheets-Sheet 3
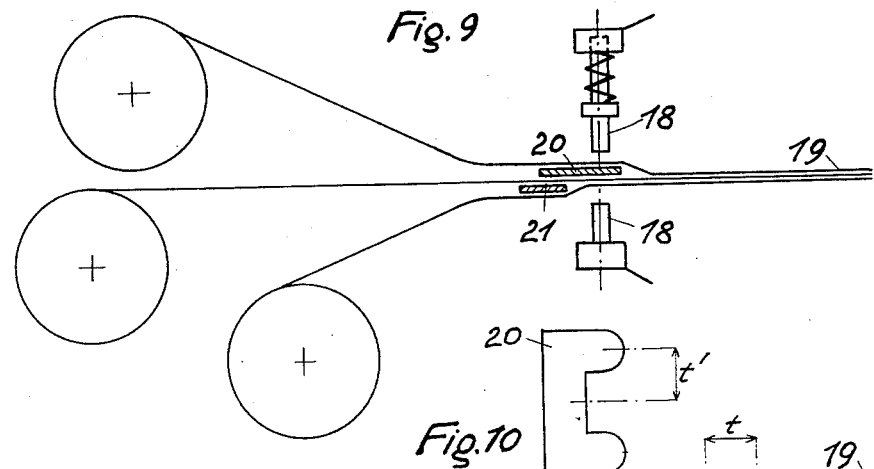
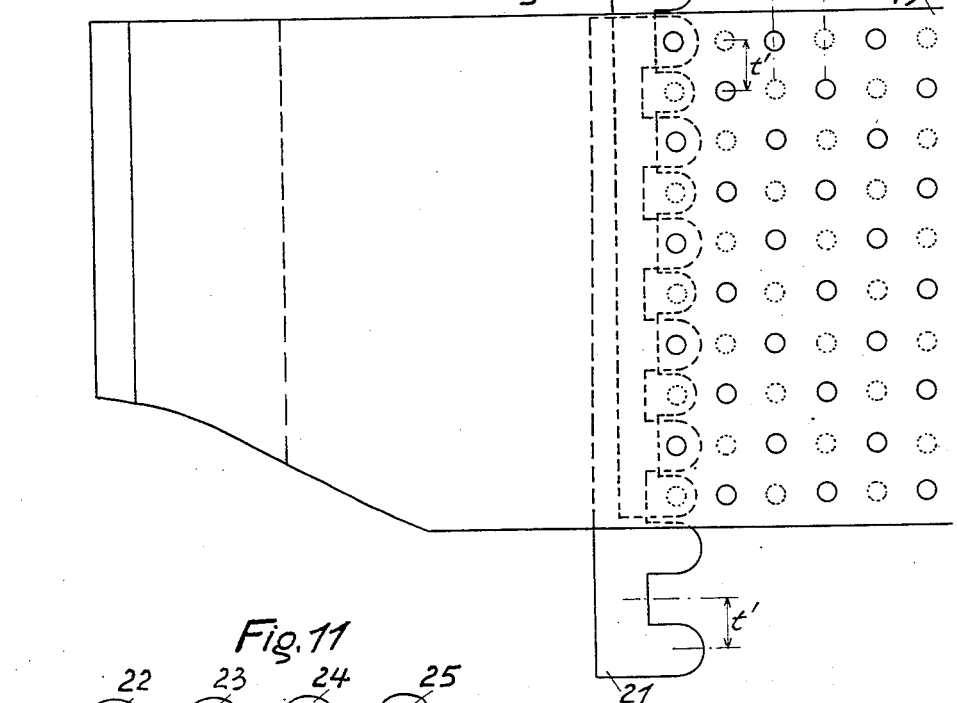
Inventor
Jean Melzer March 8, 1955  J. MELZER  2,703,770
MANUFACTURE OF FLAT INFLATABLE OBJECTS
Filed April 15, 1952  4 Sheets-Sheet 4
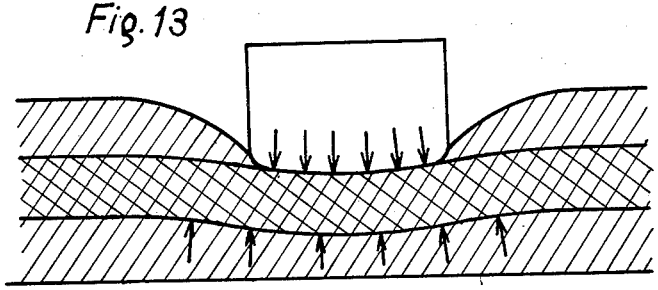
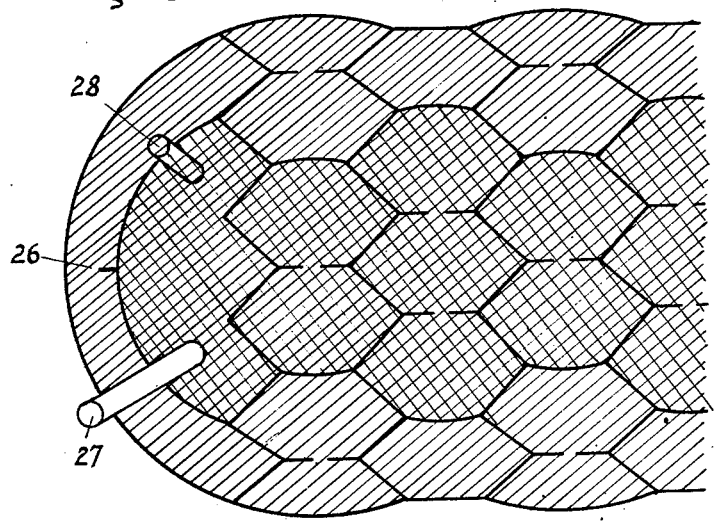
Inventor
Jean Melzer

United States Patent Office 2,703,770
Patented Mar. 8, 1955

2,703,770
MANUFACTURE OF FLAT INFLATABLE OBJECTS

Jean Melzer, Saarbrucken, Saarland

Application April 15, 1952, Serial No. 282,360

4 Claims. (Cl. 154—85)

My invention relates to inflatable flat structures of plastic sheet material, and has for its objects to improve such products as regards their manufacture and qualities.

The usual way of manufacturing an air cushion or inflatable mattress is to subdivide the space between two sheet layers into air pockets.

According to my invention, I produce such a pocketed structure from three or more sheets of plastic material by intermittently applying local sealing pressure to a stack of the sheets at a number of mutually spaced points, advancing the stack in the intermediate intervals relative to the points of pressure application so as to incrementally distribute a multitude of spot seals over the desired stack area, and alternately placing foil-separating inserts at the pressure points temporarily between one group of mutually adjacent sheets during one pressing operation and temporarily between another group of adjacent sheets during the next pressing operation. In the resulting product, different pairs of the sheets are sealed together at successively alternating spots.

According to another feature of my invention, I make the inner sheets of the stack perforated and dispose the spot seals for each pair of adjacent sheets around each second perforation.

These and other features of the method and machine and of the product resulting therefrom will be apparent from the following description in conjunction with the drawing, in which—

Fig. 4 shows schematically a cross section of another embodiment, while Fig. 5 shows the sealing pattern applicable thereto.

Figs. 6 and 7 show schematically an eight-ply structure being sealed by a pressure punch, and Fig. 8 shows schematically a cross section of the seals.

Figs. 9 and 10 show respectively a side view and top view of the essential portion of a sealing machine according to the invention, and Fig. 11 is a schematic front view of the same machinery.

Figs. 12 and 13 show schematically two mutually perpendicular and cross-sectional views of an inflatable structure with zones of respectively different pressures.

Figure 1:
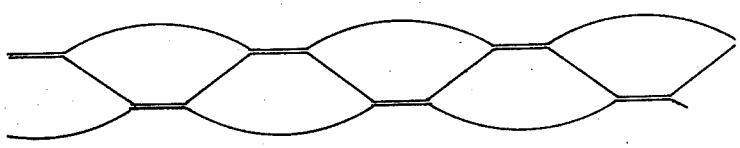
Figs. 1 and 2 show schematically and in cross section two respective inflatable sheet structures according to the invention.
Figure 2:
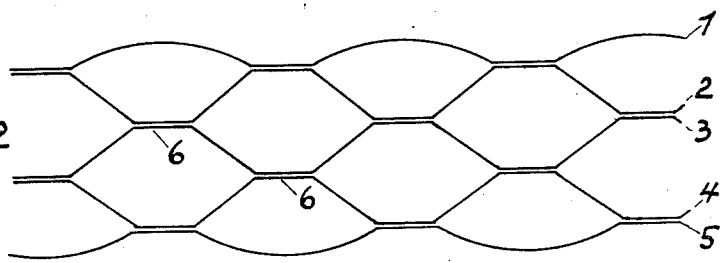
Figure 3:
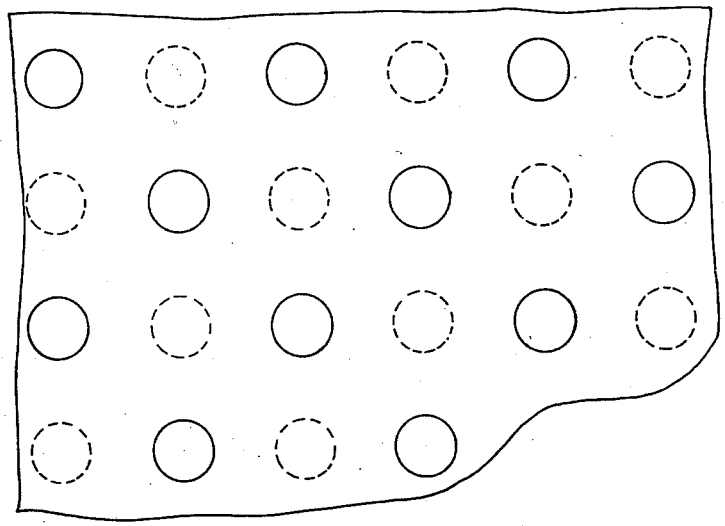
Fig. 3 shows a corresponding sealing pattern.

The flat sheet structure according to Fig. 1 is composed of three foils. The number of foils which may be combined to one sheet of lesser or greater thickness is unlimited. Fig. 2 shows a cross section of a sheet of five foils. The foils numbered 1 to 5 are sealed pairwise at the spots 6. The simplest pattern permitting such an assemblage of several foils is a system of parallel lines or, as shown in Fig. 3, a system of circular or ring-formed sealings arranged in a chess-board pattern.

A structure of $n$ layers of foil comprises $(n-1)$ layers of air which have to communicate with one another. To this end, the $(n-2)$ inner foils are perforated at adequate places. Thus the sheet structure can be inflated as a whole, as soon as the two outer foils are bonded together around the desired contour.

Fig. 4 shows a cross section of a mattress consisting of eight foils 1 to 8. The spot seals 11 have the form of rings. The inner foils 2 to 7 are perforated at 10 within the ring seals 11 where the stress on the foil is reduced. Fig. 5 shows the sealing pattern. The ring seals 11 surround the perforations 10 which serve also for stacking the foils in the right order. Figs. 4 and 5 show at 12 a section of the sealed border zone where the outer foils 1 and 8 are joined. The structure has a valve nipple at 13.

Figs. 6 and 7 show the stack of eight foils 1 to 8 under the punch 14 of a sealing press. Denoted by 15 are seal-preventing inserts. Fig. 8 shows the same section of the sheet after sealing and inflation, with inserts 15, perforations 16 and ring seals 17.

Figs. 9 and 10 illustrate another procedure to seal three or more foils pairwise in the desired pattern. A row of stamps 18 closes rhythmically on a stack of foils 19 which advances by steps ($t$).

In the case of three foils, as in this example, two sheets of metal or of non-sealing insulating material are inserted alternately between every two foils. These non-sealing insertions 20 and 21 prevent the neighboring foils from sealing in spite of the pressure and heat applied.

Fig. 11 shows the row of stamps 22 to 25. The foils are numbered 1, 2 and 3. Under stamp 22, the non-sealing insertion 20 separates foils 1 and 2, while foils 2 and 3 are sealed together. Under stamp 23, foil 3 is separated by the non-sealing insertion 21 from foil 2, while foils 1 and 2 are sealed together, and so on.

In the intervals between the closing of the stamps, and while the stack of foils proceeds one step ($t$) of its travel, the insertions pass under the neighboring stamp, and so to and fro, moving the distance ($t'$) after every operation of the stamps. This procedure is not limited to three foils, but may be used with any number ($n$) of foils, which would require ($n-1$) non-sealing insertions acting in the described weaver-frame like manner.

Another feature of the invention is a mattress or other inflatable flat structure of many foils which has zones of respectively different pressures.

To provide between two foils of the structure a zone of higher pressure than between the other foils, these two foils are not perforated and are separately sealed along the outer contour. The air can then be separately pumped into the high pressure zone, and if a single filling valve is desired, the low pressure zone can be inflated secondarily by means of a reducing valve.

Fig. 12 shows a cross section through a mattress with an inner high pressure zone (cross hatched). The border foils of this high pressure zone are joined at 26, and the pressure is applied through a main valve 27. A reducing valve 28 inflates the low pressure zones at a lower pressure.

Fig. 13 shows a cushion with a high pressure zone loaded by a weight which would crush the cushion entirely if it were inflated at the low pressure throughout. In the present case, the high pressure zone (cross hatched) carries the weight, and as it resists the bending force, the specific load on the lower, low-pressure zone is lessened so that it can support the weight. Such a two-pressure mattress can support specific loads of a wide range, and offers the advantages and comfort of a good upholstery mattress.

The invention is applicable chiefly to the manufacture of inflatable sheet structures from plastic foil, for example vinyl compound, which may be sealed by heat and pressure.

I claim:

1. The method of producing an inflatable structure from three or more layers of plastic sheets, which comprises intermittently applying local sealing pressure to a stack of the sheets at a number of mutually spaced points, advancing the stack in the intermediate intervals relative to the points of pressure application so as to incrementally distribute a multitude of spot seals over the desired stack area, and alternately placing foil-separating inserts at the pressure points temporarily between one group of mutually adjacent sheets during one pressing operation and temporarily between another group of adjacent sheets during the next pressing operation whereby different groups of sheets are sealed together at different successive spots respectively.

2. The method of producing an inflatable structure from three or more layers of plastic sheets, which comprises placing two non-perforated outer sheets and at least one perforated sheet upon each other to form a stack, intermittently applying spot-sealing pressure from the outside across the width of the stack at spots around a group of the perforations, placing during the sealing operation a number of sheet-separating inserts temporarily between one group of mutually adjacent sheets to prevent them from being sealed, advancing the stack and again applying spot-sealing pressure at spots around an adjacent group of perforations, and placing during the latter sealing operation a number of sheet-separating inserts between another group of mutually adjacent sheets, and repeating the procedure to incrementally spot-seal the desired area of the stack.

3. An inflatable structure composed of plastic sheets and comprising two outer non-perforated sheets, at least one inner sheet having distributed perforations, said sheets being disposed upon each other, each pair of mutually adjacent sheets being sealed together at a number of spots around respective perforations and each two successive ones of said spots being spaced from each other by a seal-free perforation, and said seal-free perforations of one pair being surrounded by respective seals in the next adjacent pair.

4. An inflatable structure of plastic sheets according to claim 3, comprising an inner non-perforated sheet partitioning the interior of the structure into separately inflatable chambers, and separate valve means communicating with said respective chambers for applying different pressures thereto.

References Cited in the file of this patent

UNITED STATES PATENTS

| | | |
|---|---|---|
| 2,269,342 | Johnson | Jan. 6, 1942 |
| 2,318,492 | Johnson | May 4, 1943 |